United States Patent [19]

Reed

[11] Patent Number: 4,983,242

[45] Date of Patent: Jan. 8, 1991

[54] TENNIS RACQUET HAVING A SANDWICH CONSTRUCTION, VIBRATION-DAMPENING FRAME

[76] Inventor: Roland Reed, 253 N. Westwind Dr., El Cajon, Calif. 92020

[21] Appl. No.: 267,750

[22] Filed: Nov. 2, 1988

[51] Int. Cl.$^5$ .............................................. B32B 5/00
[52] U.S. Cl. ................................... 156/172; 156/187; 264/258; 428/36.8; 273/73 C; 273/73 F
[58] Field of Search ................. 273/73 R, 73 C, 73 F, 273/73 H, 73 G; 156/171, 172, 173, 175, 187, 188, 190, 191, 192; 264/317, 258; 428/36.8

[56] References Cited

U.S. PATENT DOCUMENTS

| | | | |
|---|---|---|---|
| 3,664,668 | 5/1972 | Held | 273/73 H X |
| 3,915,453 | 10/1975 | Nishimara | 273/73 G |
| 3,927,695 | 12/1975 | Crockwell | 428/36.8 X |
| 3,949,988 | 4/1976 | Stoufer | 273/73 F |
| 4,070,020 | 1/1978 | Dano | 273/73 F |
| 4,070,021 | 1/1978 | Cecka et al. | 273/73 F |
| 4,098,505 | 7/1978 | Thompson | 273/73 F |
| 4,221,382 | 9/1980 | Cooper et al. | 273/73 F |
| 4,340,226 | 7/1982 | Haines | 273/73 C |
| 4,486,480 | 12/1984 | Okumoto et al. | 428/36.8 |
| 4,606,952 | 8/1986 | Sugimoto et al. | 428/36.8 |
| 4,657,285 | 4/1987 | Akiyama et al. | 156/187 |

FOREIGN PATENT DOCUMENTS 2495477 6/1982 France .............................. 273/73 F Primary Examiner—Anton O. Oechsle
Assistant Examiner—Bill Stoll
Attorney, Agent, or Firm—White & Case

[57] ABSTRACT

A frame for a tennis racket is formed of an inner tubular member, an outer tubular member, and a dampening sleeve of a visco-elastic material sandwiched between and bonded to the inner and outer layers. The dampening sleeve undergoes plastic deformation upon bending of the racket frame, due to the difference in movement between the inner and outer layers, and thus acts to dampen racket vibration caused by impact of the ball.

12 Claims, 2 Drawing Sheets

TENNIS RACQUET HAVING A SANDWICH CONSTRUCTION, VIBRATION-DAMPENING FRAME

This application is a continuation of application Ser. No. 049,775, filed on 5/12/87.

SPECIFICATION

1. Field of Invention

This invention relates to a sports racket, particularly a tennis racket, with a frame construction that significantly improves vibration dampening.

2. Background of the Invention

The construction of tennis racket frames has evolved in recent years from wood or wood laminate rackets to rackets having metal frames and, more recently, rackets made of resin impregnated fibers. Tennis rackets with metal frames have been made from materials such as steel, aluminum and magnesium. The most popular resin-impregnated fiber racket is graphite (carbon fiber). Composite frames, comprising laminates of several different materials, have also been developed.

Most metal rackets are formed from a continuous hollow metal tube, which is bent so as to follow the contour of the racket handle and head. Fiber resin racket frames may also be formed with a hollow tubular cross-section. Graphite resin pieces are wrapped about a spindle to form an elongated tube, and the spindle is withdrawn. The tube is then placed in a heated mold in the shape of a tennis racket frame, and a bladder inside the tube pressurizes the graphite to conform to the shape of the mold.

While wood rackets are still preferred by some players, the newer racket materials offer a number of advantages, such as a higher strength-to-weight ratios and better durability. The ability to vary and combine different materials, as well as the ability to vary the cross-sectional configuration of the frame, affords a range of selectivity in playing characteristics, in terms of strength, stiffness and feel. There are thus many different racket constructions on the market, each intended to respond to the playing ability and personal preferences of certain players.

One characteristic present in these newer rackets that is not so desirable is vibration. The degree of vibration varies depending on the racket material and construction, but each racket possesses one or more resonant frequencies and vibration will occur, especially with offcenter hits. Since the vibration is produced during the hitting stroke, at a time when the player is gripping the racket tightly, any vibration produced in the racket is imparted to the player's arm.

With most metal rackets, there is no provision for vibration dampening. In the case of graphite racket frames, it has been proposed that, rather than making the frame as a hollow tubular element, the graphite tube be filled with a core of material having energy-absorbing characteristics to reduce shock and vibration. According to these methods, a fiber resin material, e.g. carbon fibers embedded in thermoset synthetic resin such as epoxy, is wrapped about a core of uncured intumescent foam containing a blowing agent. When placed in a mold and cured, the blowing agent expands the foam and conforms the graphite to the sides of the mold.

In order to provide adequate internal pressurization of the graphite in the mold, the foam must be relatively dense. This represents a significant drawback to these processes. The use of a foam dense enough to provide the requisite pressure adds significantly to the weight of the racket.

For this reason, it is preferable to manufacture graphite racket frames as hollow tubes. If desired, foam (less dense than would be needed for pressurization) may be injected into the tubular frame afterwards to deaden the sound of a hollow racket and dampen vibration.

The use of a foam core provides some dampening of vibration. But, it would be desirable to further improve the vibration-dampening characteristics of such racket frames. It would be equally desirable to provide vibration dampening characteristics to fiber resin frame structures where a foam core is not present, as well as in other hollow frame constructions such as metal rackets.

SUMMARY OF THE INVENTION

The present invention is a frame member, especially for a tennis racket, which incorporates constructional improvements that provide inherent dampening qualities.

More particularly, a frame construction according to the invention comprises an inner tubular frame member, an outer tubular frame member, and a dampening sleeve sandwiched between the inner and outer tubular frame members. The dampening sleeve is made of a visco-elastic material, which is plastically deformable for absorbing vibration in the racket.

Taking as an example its use in the tennis racket, the racket frame includes a head portion, a throat, and a handle portion, preferably formed by a continuous frame member having the aforedescribed sandwich construction. As a tennis ball strikes the racket, it imparts a shock loading to the racket frame producing vibration. In a racket constructed in accordance with the invention, both the inner frame member and outer frame member bend under the load, but by different amounts. Thus, the facing surfaces of the inner and outer frame members tend to slide relative to one another. The dampening sleeve, being a visco-elastic material, acts to absorb a portion of the relative motion between the inner and outer frame members and thus dampening of the vibration occurs quickly.

The dampening properties of the racket are not dependent upon the presence of a foam core inside the inner tubular frame member, although such a core may be used. Also, the invention may be employed in a racket frame made of any material capable of forming a tubular frame profile. By way of example, the inner and outer tubular frame member may be formed of metals such as aluminum, steel, or magnesium, or may be formed of composites, e.g. thermosetting or thermoplastic resins, with reinforcing fibers such as carbon (graphite), fiberglass, Kevlar aramid fibers, ceramics such a silicon carbide, tungsten carbide, silica, or alumina, or boron.

For a better understanding of the invention, reference is made to the following detailed description of preferred embodiments, taken in conjunction with the drawings accompanying the application.

DETAILED DESCRIPTION OF PREFERRED EMBODIMENTS

Figure 1:
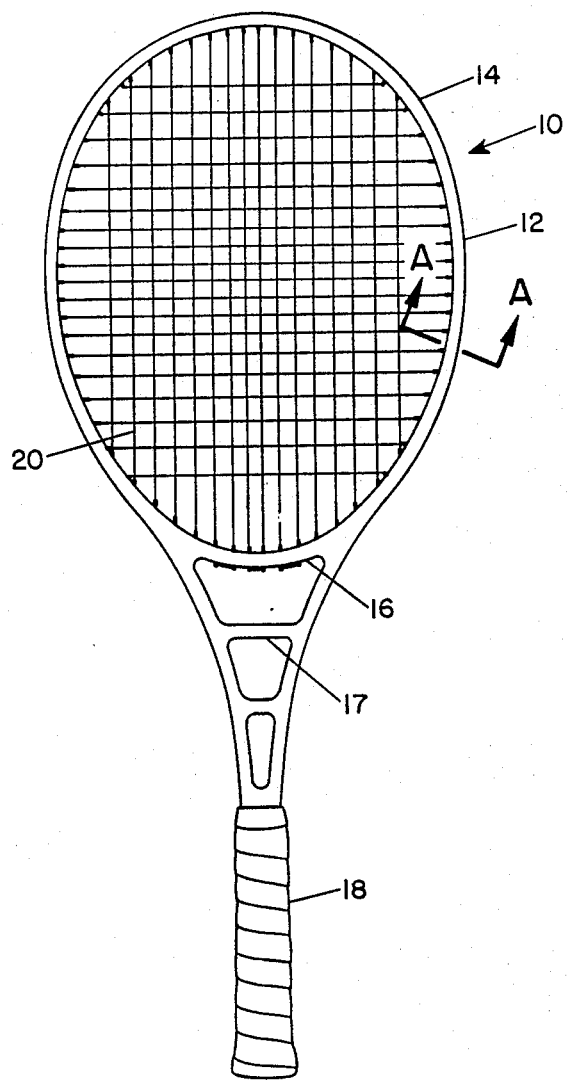
FIG. 1 is a front view of a tennis racket containing a sandwich frame construction in accordance with the invention.
Figure 2:
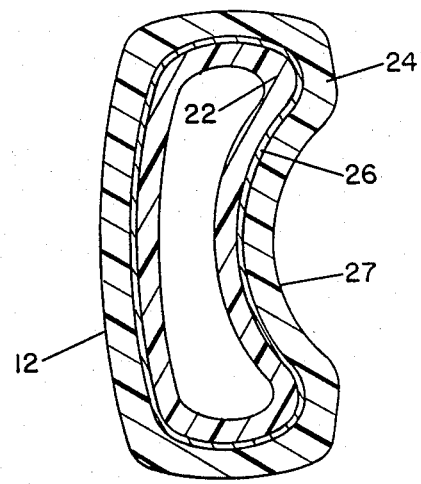
FIG. 2 is a cross-sectional view of a sandwich frame construction, taken through lines a—a of FIG. 1, on an enlarged scale.

FIG. 1 shows a tennis racket 10 including a frame 12 having a head portion 14, a throat piece 16, a reinforcing cross-piece 17, and a pair of handle portions 15 for supporting a handle 18. As described further on, head portion 14 and handle portions 15 are formed from a continuous tubular element shaped in a mold to the configuration shown in FIG. 1. The racket shown in FIG. 1 has the configuration of a series 110 racket manufactured by Prince Manufacturing, Inc., containing an oversized racket head 14 and strings 20 that are preferably spaced on the racket frame in accordance with the teachings of U.S. Pat. No. 3,999,756 in the name of Howard Head. The strings 20 are mounted in string holes, preferably employing a bumper/grommet strip through holes formed in the racket frame 12, in a manner well known, and thus not shown.

The frame 12 is composed of an inner tubular frame member 22, an outer tubular frame member 24, and a dampening sleeve 26 which is sandwiched between the inner and outer tubular frame members 22, 24. By way of example, the inner and outer frame members 22, 24 are formed of a resin-based fiber material such as graphite (carbon fiber). The dampening sleeve 26, which is bonded to the inner and outer frame layers, is relatively thin compared to the inner and outer frame members 22, 24, but is thick enough to permit the inner and outer members to slide relative to one another and, in so doing, absorb at least a portion of the sliding force.

As noted before, the structural materials used as the inner and outer layers 22, 24 can vary widely, and basically can be any material that could be formed into a tubular type of frame member and otherwise used in a sports racket. Examples of materials presently used for such purpose are composites such as thermoset or thermoplastic resins, resins with reinforcing fibers, e.g. carbon (graphite) fibers, fiberglass, aramid fibers such as Kevlar or ceramics such a silicon carbide, tungsten carbide, silica, or alumina. Fiber resin materials, for example graphite, can also have strengthening materials, such as boron strips, disposed therein for extra stiffness. Metals such as aluminum, steel, or magnesium, may also be employed as one or both of the tubular members 22, 24.

As used herein, the term visco-elastic, which applies to the dampening layer, refers to an elastomer-type of material which is not perfectly elastic, for example KRATON thermoplastic rubber, or flexible thermoset epoxy resin. Thus, when such material is deformed, at least some plastic deformation occurs so that a portion of the deformation force is absorbed and dissipated as heat. This type of material is also sometime referred to as visco-plastic or elasto-plastic, in that it has some properties of both an elastomer and plastic, i.e. it is somewhat resilient but also slides or deforms. Such materials generally have a low shear modulus, i.e. less than epoxy (which is approximately 240 ksi).

When a ball strikes the racket strings 20, the impact causes longitudinal bending of the racket frame, and possibly torque about the center axis. The frame thereafter vibrates, but the outer tubular layer tends to deflect a greater amount than the inner layer. In addition, the inner and outer layers may tend to vibrate at different resonant frequencies, owing to the difference in thickness and compositional modulus (stiffness of material), meaning that the abutting surfaces of the inner and outer layers vibrate relative to one another. The dampening layer, being plastic, deforms as the layers move by different amounts, thereby dissipating the vibrational motion.

As can be appreciated, in accordance with the present invention the frame can be made to the desired stiffness as far as the initial impact on the ball and still maintain its dampening qualities. In other words, the thickness or composition of the e.g. outer graphite layer may be varied to alter the racket stiffness. After initial impact, however, the inner and outer layers, acting together on the dampening layer, will function to dampen vibration in the same manner as described above. Thus it is not necessary to deaden the racket in order to get vibration dampening.

The following describes a method of manufacture of a graphite frame having a sandwich construction. The process is similar to known processes for making graphite frames.

Figure 3:
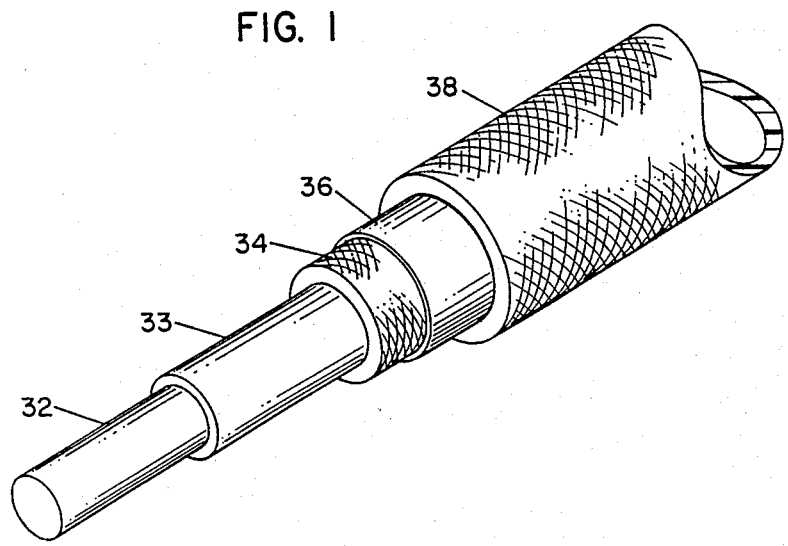
FIG. 3 is a perspective cutaway view showing a lay-up of a sandwich frame according to the invention, prior to molding.
Figure 4:
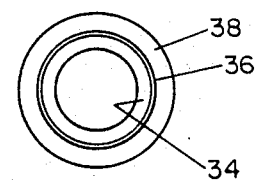
FIG. 4 is an end view of the lay-up of FIG. 3 at a subsequent production step.

Referring to FIG. 3, a bladder 33 is placed over a steel mandrel 32. The bladder is of a known type used in the construction of graphite tennis rackets. Several thin strips of fiber resin sheet material are rolled onto the mandrel 32 over the bladder 33 to form an inner tubular layer 34. The strips may be applied in alternating angles in accordance with known methods. A sheet of elastomer material is thereafter wound over the inner layer 34 to form an intermediate layer 36. Finally, a number of layers of resin impregnated fiber are wound over the intermediate layer 36 to form an outer tubular layer 38. The strips forming the outer layer 36 of the fiber resin material are also preferably wound up at alternating or varying angles, for strength. Methods for rolling up graphite strips are known, and the layers of the present invention are formed in a similar manner, except that the inner, outer, and intermediate strips are rolled up separately to form discrete layers. Once the layup is completed, the mandrel is withdrawn, producing a rounded bar sandwich as shown in FIG. 4 (for clarity, the bladder 33 is omitted).

The composite sandwich is then placed in a heated mold, shaped to define a tennis racket frame, and cured, in the same manner as in normal graphite production processes. During the curing process, the bladder element 33 inside the hollow tubular center of the frame material is pressurized to force the frame member against the walls of the mold. Customarily, the mold produces a stringing groove 27 along the outside surface of the head portion of the racket frame, as shown in FIG. 1, which receives a grommet strip for mounting the strings. Also, a preformed throat piece 16 and optionally one or more cross-pieces 17, which are preferably made by an expandable foam process of the type described in the background section of the application, are placed in the mold and taped to the main tubular element prior to curing. Such procedures, as well as the molds for producing rackets of this shape, are well known.

If desired, rather than building up the sandwich on a mandrel 32, the sandwich may be formed on an inner core of foam material, in accordance with known expandable foam processes. The foam expands during the curing process and acts, in place of the bladder, to force the graphite frame shell against the mold surfaces.

At normal curing temperatures, resin binder in the fiber resin layers will bond to visco-elastic materials. Thus, the normal molding and curing process will produce a sandwich in which the dampening layer 26 is adhered to the inner and outer frame members 22, 24. When the racket head thereafter flexes, the movement between the inner and outer sections causes the visco-elastic material to deform, absorbing a portion of the vibration.

Preferably, the graphite resin composite material used for the inside layer has a higher modulus (is stiffer) than the outside layer. However, the thickness of the inside layer is preferably considerably less than the thickness of the outside layer.

As noted above, the present invention may be employed using inner and outer frame members 22, 24 made of other plastic fiber resins. The intermediate dampening layer may also be employed, in principle, with other frame materials such as metals used as the inner layer, outer layer, or both.

A tennis racket frame made in accordance with the present invention was tested against a Prince graphite Series 110 tennis racket for vibration dampening characteristics. The control sample racket frame had an all graphite tubular shell with a nominal wall thickness of 0.065" and included a foam core. The sandwich construction test racket frame was a hollow tubular configuration, without a foam core, made in the same mold as the control sample frame and had nominal wall thickness of 0.010" for the inside graphite layer, 0.020" for the visco-elastic dampening layer, and 0.040" for the outside layer. The inner graphite layer had a modulus of 50 million psi versus 30 million psi for the outside layer, and a thermoset epoxy was used as the visco-elastic material. Both rackets were strung with nylon at 70 pounds.

Each racket was, sequentially, placed in a test rig and clamped at the top of the tail section (50 cm from the tip). An accelerometer was placed on the tip. Vibration was initiated by directing a tennis ball at the center of the strings. The vibration amplitude and frequencies of each racket were measured on an Ono Sokki CF300 portable FFT analyzer.

Figure 5A:
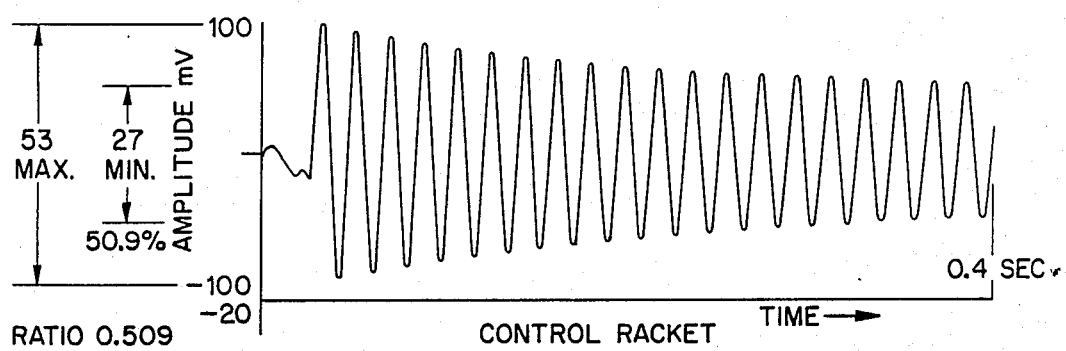
FIGS. 5a and 5b are graphs comparing the vibration amplitudes of a conventional tennis racket with a racket according to the invention.
Figure 5B:
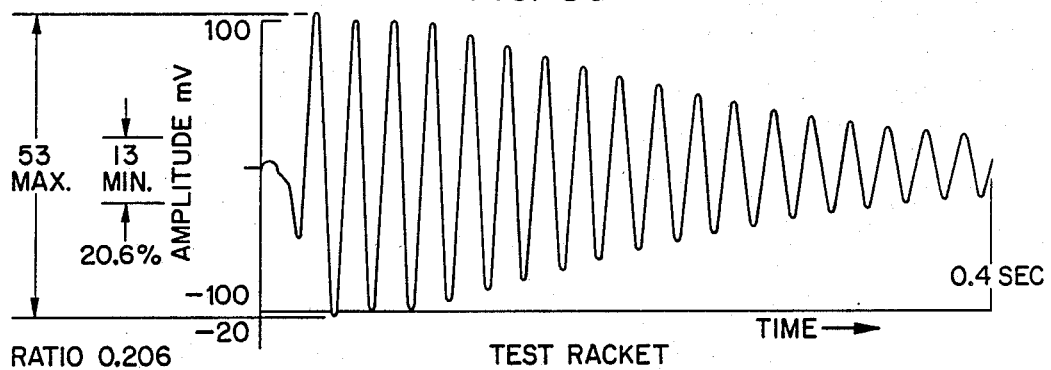

FIGS. 5a and 5b show the vibration amplitudes over time for the two rackets. As indicated in the charts in FIGS. 5a and 5b, after a period of 0.4 seconds, the ratio of vibration in the sandwich construction racket was 0.206 of the original vibration, whereas the vibration in the control racket was 0.509. Thus, a racket construction in accordance with the invention dampened vibration twice as well as in the control racket.

Figure 6A:
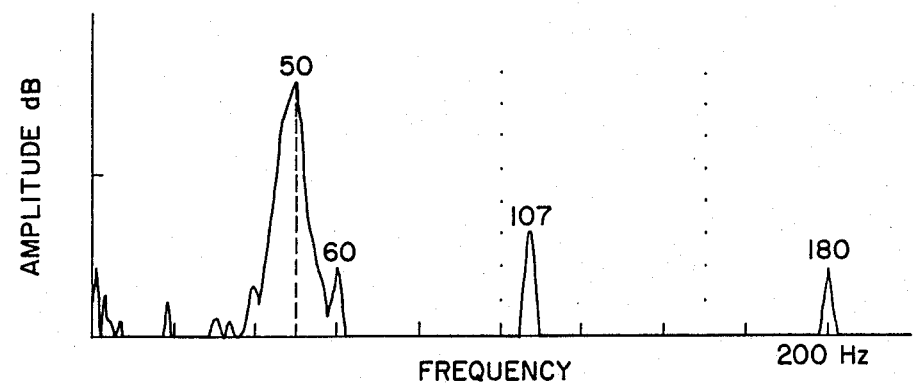
FIGS. 6a and 6b are graphs comparing the vibration frequencies present in a tennis racket frame with and without, respectively, a dampening layer according to the invention.
Figure 6B:
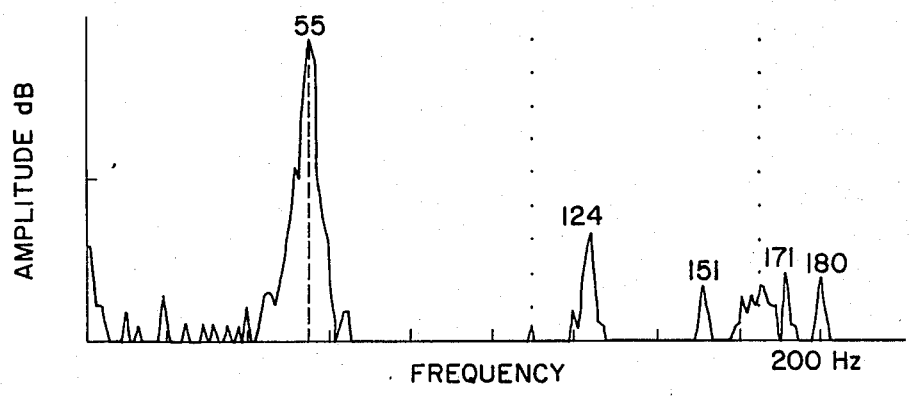

FIGS. 6a and 6b record the vibration frequencies present in the two rackets. It can be seen that many of the small-amplitude frequencies are eliminated in a sandwich construction according to the invention.

The foregoing represents preferred embodiments of the invention. Additional variations and modifications of the invention will be apparent to persons skilled in the art, without departing from the inventive concepts disclosed herein. All such modifications and variations are intended to be within the scope of the invention, as defined in the following claims.

I claim:

1. A method of making a racket frame for tennis rackets and the like comprising the steps of:
   (1) providing thin, flexible sheet material of a fiber-reinforced resin and flexible sheet material of a visco-elastic material;
   (2) forming an elongated inner tubular member from the fiber reinforced resin sheet material;
   (3) wrapping the visco-elastic sheet material over the inner tubular member to form a dampening sleeve;
   (4) wrapping fiber-reinforced resin sheet material over the dampening sleeve to form an outer tubular member therearound; steps 2–4 thereby producing a bar member having a sandwich construction; and
   (5) heating and molding the bar member to cure the resin materials, to bond the visco-elastic material to the resins, and to form a racket frame having a head portion for supporting strings and a pair of handle portions for supporting a handle.

2. A method according to claim 1, wherein the dampening sleeve and inner tubular member are formed with thickness substantially smaller than the outer tubular member.

3. A method of making a racquet frame for tennis racquets, comprising the steps of:
   (a) providing flexible sheet material of a fiber-reinforced resin and flexible sheet material of a visco-elastic material;
   (b) forming an elongated inner tubular member from the fiber-reinforced resin sheet material;
   (c) wrapping visco-elastic sheet material at least once about the inner tubular member;
   (d) wrapping fiber-reinforced resin sheet material over the visco-elastic sheet material, at least once about the inner tubular member, steps (a)–(d) thereby producing a bar member having a sandwich construction of, sequentially, resin sheet material, visco-elastic sheet material, and resin sheet material; and
   (e) heating and molding the bar member to cure the resin materials, to bond the visco-elastic material to the resin material, and to shape the bar member to form a racquet frame having a head portion for supporting strings and a handle portion for supporting a handle.

4. A method according to claim 3, wherein the inner tubular member is formed by wrapping a plurality of thin layers of sheet material into a tubular shape, and wherein the step of wrapping fiber-reinforced resin sheet material over the visco-elastic sheet material comprises wrapping a plurality of thin layers of sheet material to form an outer tubular member around the visco-elastic material.

5. A method according to claim 4, wherein the step of wrapping the visco-elastic sheet material comprises wrapping a plurality of thin layers of sheet material to form a dampening sleeve.

6. A method according to claim 4, wherein layers forming the inner tubular member, as well as layers forming the outer tubular member, are wound at more than one angular orientation.

7. A method according to claim 6, wherein the step of wrapping the visco-elastic sheet material comprises wrapping a plurality of thin layers of sheet material to form a dampening sleeve.

8. A method according to claim 6, wherein the inner tubular member has a wall thickness substantially less than the outer tubular member.

9. A method according to claim 8, wherein the visco-elastic sheet material is wound to form a dampening sleeve having a wall thickness substantially less than the outer tubular member.

10. A method according to claim 9, wherein the inner tubular member has a wall thickness of about 0.010", the outer tubular member has a wall thickness of about 0.040", and the dampening sleeve has a wall thickness of about 0.020".

11. A method according to claim 4, wherein the visco-elastic material has a viscosity less than 240 KSi.

12. A method according to claim 11, wherein the fiber-reinforced resin is a carbon fiber-reinforced resin.

* * * * *